(No Model.) 3 Sheets—Sheet 1.
W. E. & F. J. PRINDLE.
LAWN MOWER.
No. 482,752. Patented Sept. 20, 1892.
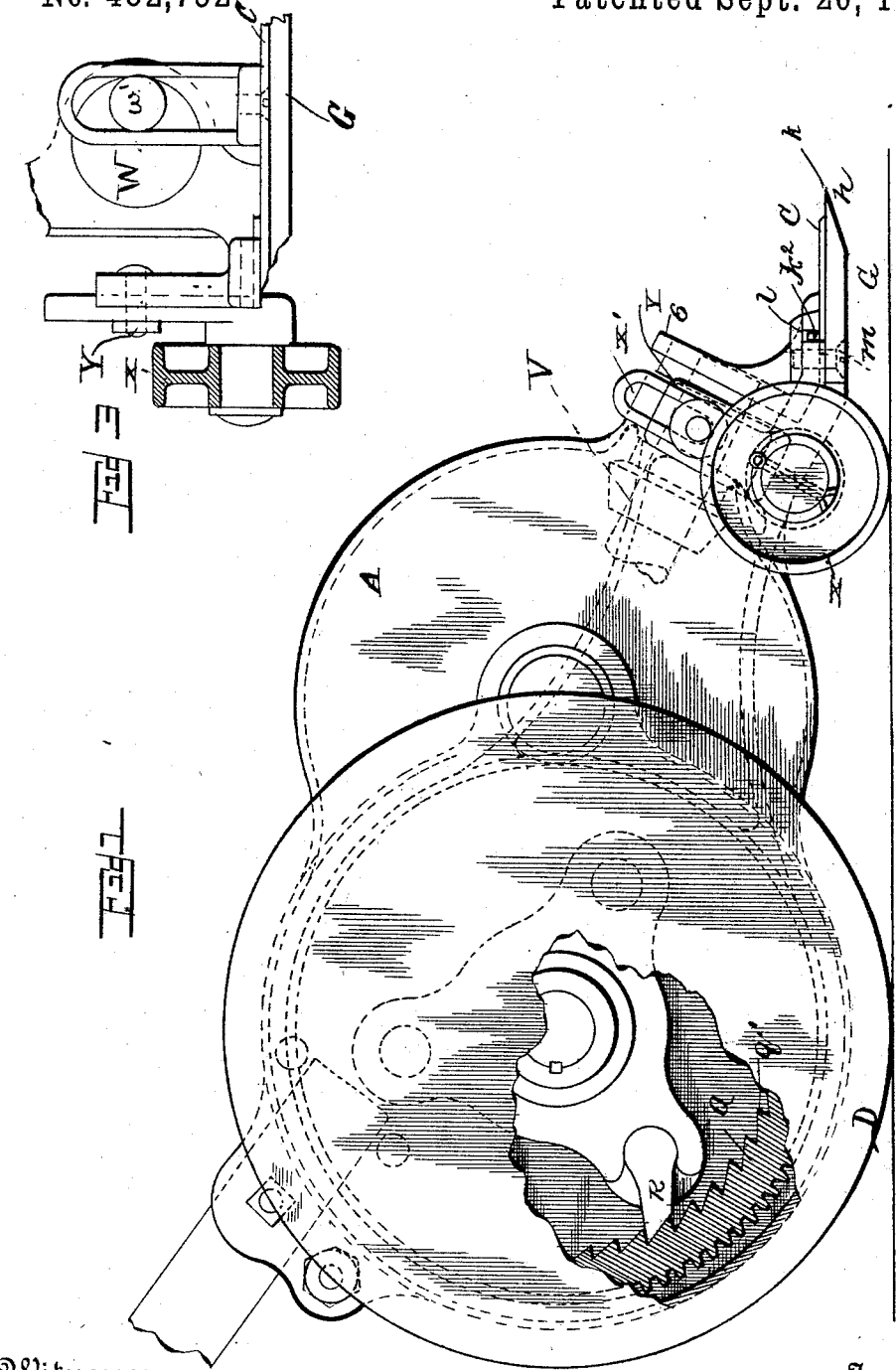
Witnesses
Inventors
Wm E. and Fred'k J. Prindle
By their Attorneys
John J. Halsted & Son

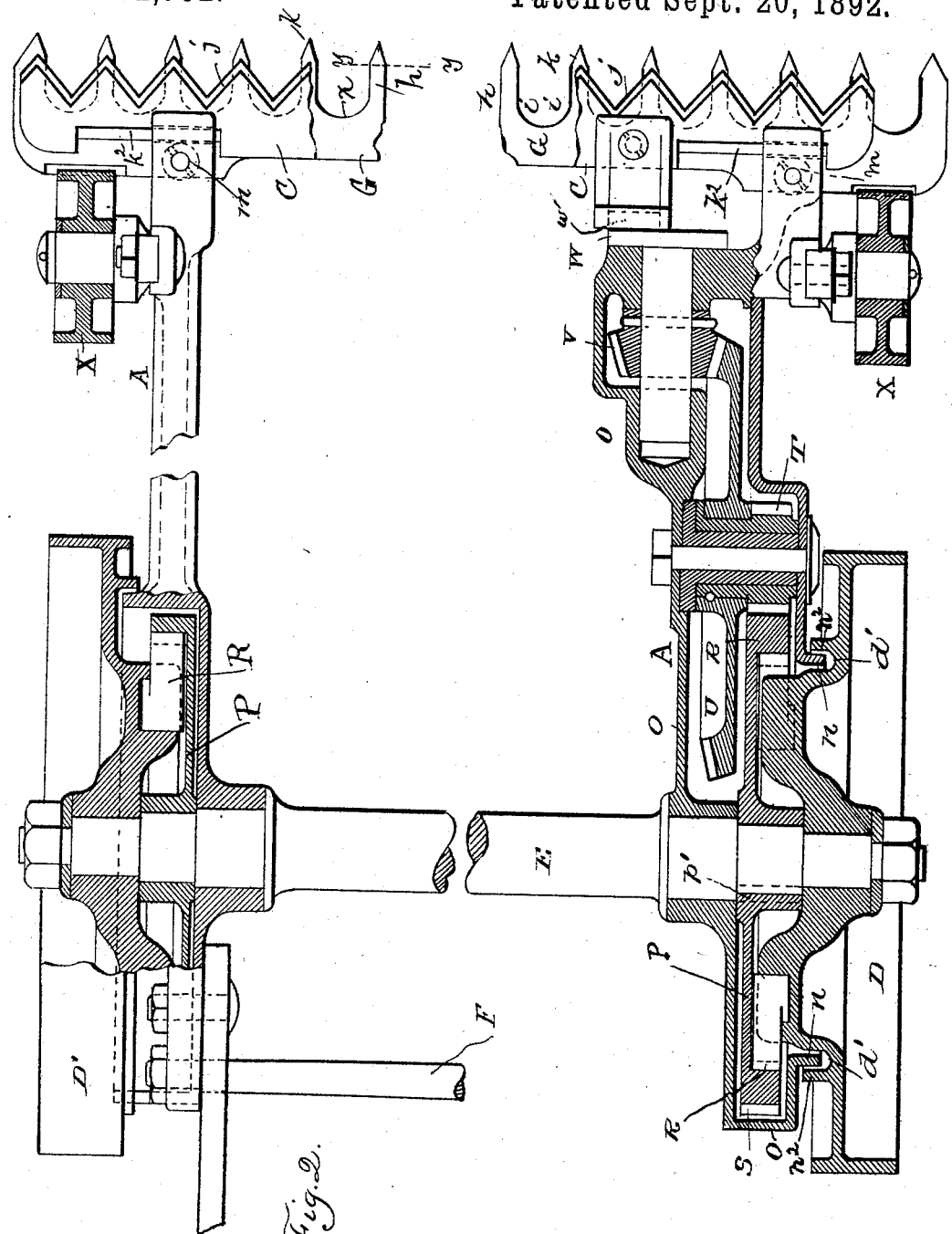

(No Model.)
W. E. & F. J. PRINDLE.
LAWN MOWER.
No. 482,752.                    Patented Sept. 20, 1892.
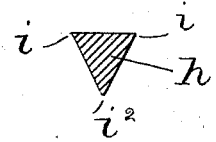
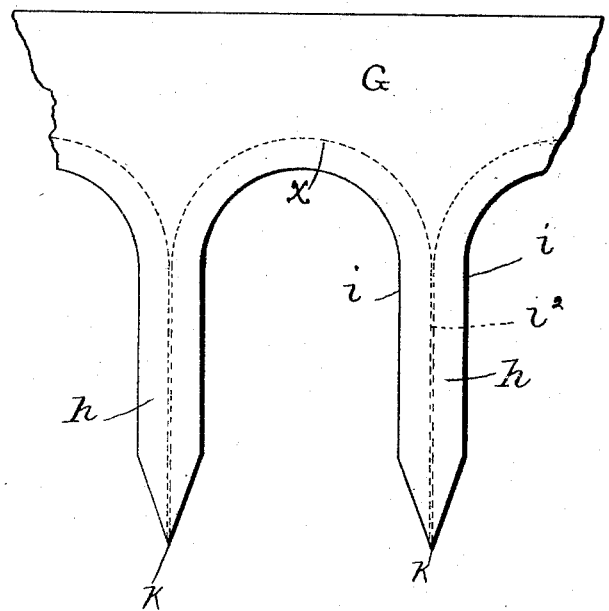

UNITED STATES PATENT OFFICE.

WILLIAM E. PRINDLE AND FREDERICK J. PRINDLE, OF AURORA, ILLINOIS.

LAWN-MOWER.

SPECIFICATION forming part of Letters Patent No. 482,752, dated September 20, 1892.

Application filed January 28, 1892. Serial No. 419,579. (No model.)

*To all whom it may concern:*

Be it known that we, WILLIAM E. PRINDLE and FREDERICK J. PRINDLE, of Aurora, in the county of Kane and State of Illinois, have invented certain new and useful Improvements in Lawn-Mowers; and we do hereby declare that the following is a full, clear, and exact description of the invention, which will enable others skilled in the art to which it appertains to make and use the same, reference being had to the accompanying drawings, and to letters of reference marked thereon, which form a part of this specification.

So far as known to us lawn-mowers having a stationary and also a reciprocating cutter-bar have been few in number and have not come into general use, probably because of the tender and flexible character of the blades of grass, the forms of the cutting knife or knives, and the tendency to bear downward and to pass over without cutting a considerable portion of the grass. In most, if not all, existing machines having rotary or other cutters it is found difficult to cut the grass as short as is desirable or to prevent dust, dirt, grass, &c., from working into the inside of the machine and obstructing the action of the gearing, and the top cutter or knife of the lawn-mowers having a reciprocating cutter-bar or in mowing-machines as heretofore constructed frequently becomes choked by grass getting into the slots in the top cutter and under the heads of the screws which hold it.

Our present invention provides a lawn-mower having a peculiar stationary bar and a reciprocating cutter-bar, and which has been tested and which satisfactorily avoids the above-named and other pre-existing difficulties, and which makes a short clean cut near the ground and practically prevents all clogging of the gearing or of the sliding cutter-bar. It also includes an improved means for preventing dirt or gravel from entering the box or casing and other features presently to be described.

In the drawings, Figure 1 is a side elevation with parts broken away; Fig. 2, a plan view, partly in section, of a lawn-mower embodying our improvements; Fig. 2*, a detail, much enlarged, showing a cross-section of one of the knives of the fixed cutter-bar just back of the terminal taper—say at the line *y y* of Fig. 2 or anywhere between the end bevels and the curve between two teeth *h;* Fig. 3, a detail, partly in section, of the right hand of the front of the machine and showing the crank and adjacent parts for driving the reciprocating or upper cutter-bar; and Fig. 4, a detail of about twice the actual size, showing in plan view two of the stationary teeth.

A A are the side frames, in each of which, respectively, is completely housed or covered the main driving-gear used at the respective sides of the machine, the reciprocating cutter-bar or blade C being driven from the gear at the right side.

D D' are the traction-wheels, loose on shaft E; F, a rod connecting the two side frames at the rear, and G the stationary cutter-bar or blade, having a novel character of teeth, and which bar connects the side frames at the front.

We will first describe the specially-constructed stationary knives and their relation to the reciprocating cutters, and whereby we are confident that we have successfully solved the long-sought problem of a good practical lawn-mower having a reciprocating cutter-bar. The knives *h* of the cutter-bar G are not of ordinary saw-tooth form or similar to those in the reciprocating bar C, but, on the contrary, are made with parallel cutting sides or edges *i* for all that portion which comes into cutting action with the edges of the knives *j* of bar C. They resemble the tines or prongs of a fork or the teeth of a comb. Their tips *k* taper to a point. These knives are also for the greater portion of their lengths triangular in cross-section, substantially as shown in Fig. 2*, thus affording sharp side edges $i$ $i$, serving for cutting-edges, and a central bottom edge $i^2$, this triangular form by reason of the beveled tips converting the forward end into a terminal point or extremity, as seen in Fig. 1. These knives are not like ordinary finger-bars. They have no retroverted portion extending backward and over the reciprocating cutters, and between which doubled portion of the finger-bar a reciprocating bar plays. On the contrary, the whole of cutters *h* is below the plane of cutter-bar C, and the tips of knives *h* are not blunted by being bent or curved backward. These tips are therefore free, like a needle or sharp bodkin, to enter between the delicate tender blades of short or other grass to separate it promptly without bearing them down or pushing them forward, and they practically have no escape from being cut either by the sharp edges $i$ $i$ or between these edges and the cutters of bar C. This construction, (when the machine is in operation cutting a lawn,) as contrasted with the well-known form of cutters in which both the fixed and the reciprocating bars have saw-shaped cutters, like $j$, works as follows: Each cutting-edge $j$, being at a very acute angle with the straight edges $i$, does not tend to bear or push away the tender blades of grass without cutting them, as always must be the case in lawn or hand mowers having the cutters of both bars formed like $j$, for it must be noted that in such last-named cutters the cutting-edges of the upper and lower bar incline to each other at a large angle, and the pushing forward of the mower is not rapid enough in hand-mowers nor the angle between any two adjacent cutting-edges acute enough to take a proper shearing hold on the young tender grass, although such sets of sawtooth cutters in large mowing-machines, moving forward much faster, and drawn with the usual two-horse power, and acting on high or stouter and stiffer material, and not needing to cut so near the ground, may work satisfactorily.

With our construction the inclination which the knife-edge of the reciprocating cutter has to the cutting-edge of the straight under teeth, and consequently the angle between them at the moment of cutting, is just one-half of the inclination or angle between any two adjacent teeth of the upper cutter $c$, so that a quick sure hold of the grass is effected. The tendency of the saw-shaped teeth to merely push away the grass either laterally or forward of the cutters and then to ride over it uncut, which has been found to be the case when the under bar also has such old form of teeth, is thus avoided and a clean cut is made. The pointed tips of the teeth of the bar G project forward of the points of the reciprocating bar C, and thus readily enter, gather, divide, and present the grass admirably to the cutters without unduly pushing or bending it downward or aside, either to the right or left, before the cutters can act upon it. Grass must be gathered just right and promptly cut as gathered or it will be bent forward and not cut at all. We find our machine gathers and cuts perfectly. The cross-section of the knives $h$ is triangular, as shown in Fig. 2*, and its under bevels continue all or substantially all around the curve $x$ of bar G. Thus the sharp edges serve as cutters in every portion which coacts with the cutter C, and the under bevel of the curved part avoids any abrupt thick portion, and thus prevents any clogging or obstruction from any such cause.

Our means for preventing any clogging at the points where the reciprocating cutter is held down upon the stationary one are as follows: The cutter-bar C has near each end and on its upper side an upturned portion at right angles to its body and constituting an upright rib $k^2$, which projects into a groove $l$, made transversely in the under side of the side frames, respectively, and, as will be seen, just forward of the screws or bolts $m$, which hold the fixed cutter-bar C to the frame. This avoids any slot or opening in the bar C to admit dirt, grass, &c., as the two cutters are held one fixedly and the other adapted to be reciprocated by screws or bolts, as shown, and which enter ordinary screw-holes and by their heads close them up. The upper edge of rib $k^2$ is preferably rounded, as shown in Fig. 1. This facilitates its traverse. If any fine dust should enter groove $l$, it will drop out by its own gravity. No finger-guards are used on the under knives to cover the tips of the upper ones. All liability of clogging from that cause is therefore avoided.

The gearings and the means for housing them are as follows: The driving or traction wheel D has on its inner face, between its hub and perimeter and distant from such perimeter about one-third of the radius of the wheel, an inwardly-projecting flange $n^2$, between which and the hub is a narrow deep annular groove $d'$, into which enters a broad outwardly-projecting annular flange $n$, parallel with the shaft E, such flange projecting outward from the outer box portion $n'$ of the casing or casting O in a circle much nearer to the axis of the shaft than the perimeter of the driving-gear within said box and forming part of a casing or casting O, between which and the wheel D is entirely housed and covered the gear-wheel P, keyed to the axle, as shown at $p'$. This gear-wheel has a circle Q of inwardly-projecting ratchet-teeth $q'$ and on its perimeter a circle of gear-teeth. Swing dogs or pawls R (preferably three in number) are held, as shown, in the inner face of the hub of the wheel D, so that one or more shall always be in engagement with the teeth $q'$. The perimeter of wheel P has a circle of gear-teeth S, which engage with and drive a pinion T, on whose shaft is keyed, as shown, a bevel-gear U, which pinion and gear are both inclosed within an extension of the casing O, as is also the beveled pinion or gear V, which drives the crank-disk W and its pin $w'$, which impart the reciprocating motion to the cutter-bar C. The casing on the opposite side of the machine is similar, so far as relates to the inclosure of gear-wheel P and dogs R, and the flange $n$ and groove $d'$ are so far from the tread of the wheel as to be above any loose gravel, &c., on the ground. X X are small rollers or wheels, which, as will be seen, may by means of slot X' in their supports and by set-screws Y be adjusted as needed to cut at any desired height, so as to cut the grass long or short. It will be seen that by our special means for surrounding and inclosing the driving-gears, ratchets, and dogs, supplemented by the flanges $n^2$ and $n$ and the deep groove $d'$, the exclusion of dirt is as complete as it is possible to be. It should be here remarked, and as is well known, that almost any shape of teeth will cut long grass, while the same will not work well at all in short grass.

We claim—

1. In a lawn-mower, a fixed cutter-bar whose knives or blades have the following characteristics, namely: an upper surface in the same continuous plane to their extreme tip, triangular in cross-section as far back as the inner angles of the movable blades, long, narrow, and with their sides parallel with each other, and having their tips beveled to a point in the line of their top surface.

2. In a lawn-mower, the combination, with a fixed cutter-bar having narrow parallel-sided blades triangular in cross-section as far back as the inner angles of the movable blades and terminating in a sharp point in a line with their flat top surface, of a reciprocating cutter-bar having its cutters of ordinary saw-tooth or triangular form, substantially as set forth.

3. A reciprocating cutter-bar having near each of its ends an upwardly-projecting rib $k^2$, integral with and bent up at right angles to the body of the bar, in combination with stationary parts of the frame or machine, having in their under faces corresponding grooves in which said ribs lodge and move, substantially as and for the purpose set forth.

4. A traction-wheel for lawn-mowers, having an inwardly-projecting annular flange $n^2$ between its hub and perimeter and a deep annular groove between such flange and hub, in combination with the gear-inclosing case O, having the outwardly-projecting broad annular flange $n$ between its perimeter and hub and entering such groove, all substantially as shown and described.

WILLIAM E. PRINDLE.
FREDERICK J. PRINDLE.

Witnesses as to William E. Prindle:
J. E. MINETT,
F. M. ELLIOTT.

Witnesses as to Frederick J. Prindle:
G. N. PIFER,
FRANK STRAUS.